J. Stark.
Seed-Planter.
N° 72,333.  Patented Dec. 17, 1867.
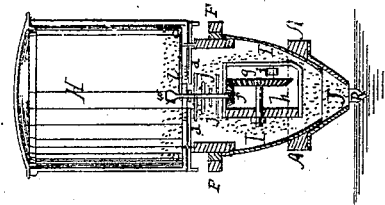
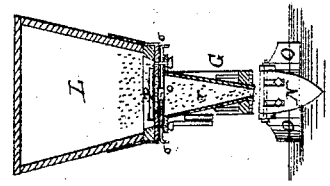
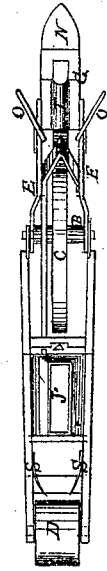
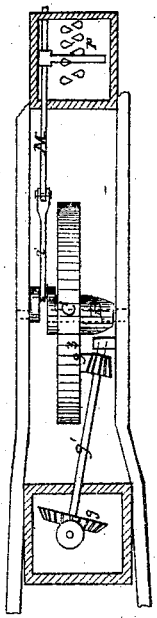
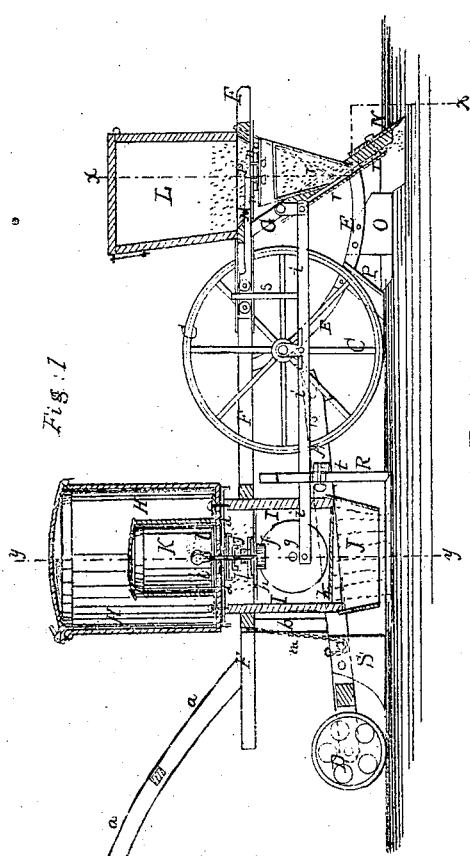
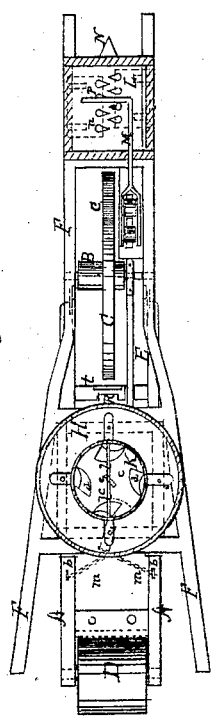
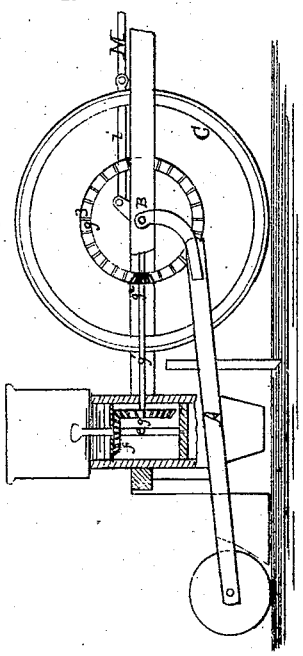
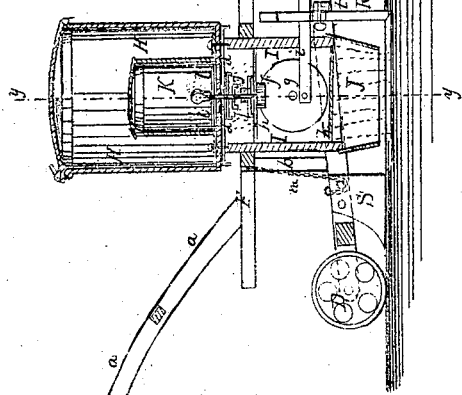
Witnesses.
Inventor:
John Stark
Per Munn & Co
Attorneys

United States Patent Office.

JOHN STARK, OF THOMASVILLE, GEORGIA.

Letters Patent No. 72,333, dated December 17, 1867.

---

IMPROVEMENT IN SEED-PLANTERS.

---

The Schedule referred to in these Letters Patent and making part of the same.

---

TO ALL WHOM IT MAY CONCERN:

Be it known that I, JOHN STARK, of Thomasville, in the county of Thomas, and State of Georgia, have invented a new and improved Seed-Planter; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my invention.

Figure 2 is a plan or top view, partly in section, of the same.

Figure 3 is a vertical transverse section of the same, taken on the line $x\,x$, fig. 1.

Figure 4 is a vertical transverse section of the same, taken on the line $y\,y$, fig. 1.

Figure 5 is an inverted plan view of the same.

Figure 6 is a longitudinal vertical section of a modification of the same.

Figure 7 is a plan or top view of the same.

Similar letters of reference indicate corresponding parts.

This invention relates to a new machine for planting all kinds of seed, from the largest to the finest sorts, and for spreading pulverized manure as well as for preparing the ground for the reception of the manure and seed, and for covering the furrow made and for rolling the land.

The invention consists in arranging a seed-box upon a frame, which is hinged to the front end of another frame, in which two wheels, one in its front and the other in its rear end, have their bearings. The axle of the front wheel is provided with a crank or gear-wheel, by means of which it rotates a vertical arbor arranged within the cylindrical seed-box. The arbor is provided with stirrers, above and below the perforated bottom of the seed-box, and the bottom is provided with adjustable slides, by means of which the size of the holes can be regulated according to the kind of seed to be sown. Below the bottom of the seed-box is an oblong funnel-shaped vessel, which fits with its end into a similar funnel formed on the lower frame, so that if the upper frame is raised the seed will still have to fall through the lower funnel, which is on a frame that cannot be raised. The seed will, by this arrangement, not be exposed to the wind when the upper frame is raised. Upon the upper frame, in front of the main driving-wheel, is arranged a manure-box having a perforated bottom with adjustable slides and a sliding stirrer, which is operated from the crank on the main driving-wheel. From this box the manure or fertilizer is dropped into a tube, which is fixed on the standard of a plough, opening the furrow for the manure. Behind the plough are two fixed shares, which close the furrow over the manure, and then a triangular scraper, in rear of the shares, smooths the ground above the manure. In front of the seed-box is arranged an up-and-down adjustable marker, which makes a small furrow for the reception of the seed. Shares in rear of the seed-box close this furrow, and the rear wheel acts as a roller to press the ground.

A represents an oblong or other frame, made of wood or other suitable material, of suitable size. In the front end of the frame A are the bearings for an axle, B, upon which a large driving-wheel, C, is mounted, and in the rear end of the frame A are the bearings for the axle of a roller, D. To the axle B are also pivoted two bars, E E, which form braces of an oblong frame, F, their lower ends being secured to a plough-standard, G, projecting from the under side of the frame F, as is clearly shown in fig. 1. The rear end of the frame F is provided with handles, $a\,a$, and rests by means of inclined or vertical bars, $b\,b$, upon the rear end of the frame A. The bars $b\,b$ are either fastened to the frame F or to the frame A, and their free ends rest against the horizontal bars of the frame to which they are not fastened. Thus, a bearing on the rear end of the frame A is obtained, so that, by pressing upon the handles $a$, the front part of the frame F, as well as the driving-wheel C, may be raised off the ground, the whole apparatus being then supported by the roller D. The rear end of the frame F is also connected with the frame A by means of chains or cords $m$, as shown. Between the wheels C and D is secured upon the frame F a cylindrical seed-box, H, resting upon a rectangular hopper-shaped box, I, as shown in fig. 4. The lower end of the box I fits into the upper end of a similar-shaped box, J, which is secured to the frame A, as is clearly shown in fig. 4. The bottom, $c$, of the seed-box H is perforated with four, more or less, holes, as shown in fig. 1. On the under side of the bottom, $e$, is arranged a series of oscillating plates, $d\,d$, by means of which the holes in the bottom can be partly or wholly closed, so that the apparatus may be adapted to different kinds of seeds. The plates $d$ can be clamped in any position by means of thumbscrews, as shown. Within the boxes H and I is arranged a vertical shaft, $e$, which carries a pinion, $f$, meshing into a gear-wheel, $g$, the latter being arranged within a box, $h$, that is enclosed by the funnel I, as shown. The wheel $g$ receives motion from a rod, $i$, which is connected with a crank on the axle B of the driving-wheel. The wheel $g$ may also be mounted on a shaft, $g^1$, which receives motion by means of a pinion, $g^2$, meshing into a gear-wheel, $g^3$, which is mounted on the shaft B, as is indicated in figs. 6 and 7. The shaft $e$ carries below the bottom, $c$, of the seed-box a series of stirrers or arms, $jj$, which distribute the seed in the funnel I, so that the same may fall well spread. The ends of the arms $j$ may be turned up, as in fig. 1, or not, as in fig. 4; for agitating cotton-seed, the shaft $e$ should be revolved with great velocity. Upon the bottom of the seed-box H may be set a cylinder, K, which, when small seed is to be sown, keeps the same better collected than it would be in the large cylinder. The upper end of the shaft $e$ carries close above the bottom, $c$, a set of sweepers or arms, $ll$, which carry the seed towards the holes. These arms $l$ must be as long as the diameter of the cylinder in which they are arranged, as shown respectively in figs. 1 and 4. For this purpose the arms $l$ are sliding in the shaft $e$ and are clamped by a screw, $w$. Upon the front end of the frame F is secured a box, L, having a perforated bottom, $n$, and adjustable slides, $o$, under the same, as shown in fig. 3. A sliding arm, $p$, secured to a bar, M, stirs the fertilizing-powder which is placed in the box L, so that it may fall through the holes into a tube, $r$, in which it is conducted to the ground. The bar M receives motion from an arm, S, which is attached to the bar $i$, as shown in fig. 1, or is jointed directly to such a connecting-rod, as shown in figs. 6 and 7. The tube $r$ is arranged along the plough-standard G, on the end of which a ploughshare, N, is secured, the same opening the furrow for the fertilizer. Behind the tube $r$ are secured to the bars E two oblique shares, O, which close the furrow above the fertilizer. Behind the shares O, and in front of the wheel C, is suspended from the bars E a triangular share, P, with its point forward, as shown in fig. 5, said share P smoothing the ground over the furrow. Behind the wheel C is arranged, in a cross-bar, $t$, of the frame A, an up-and-down adjustable marker, R, which opens a small furrow for the seed. Behind the seed-box is suspended from the the frame A another pair of oblique shares, S S, which close the ground over the seed, and finally the wheel D rolls the ground over the seed. The forward part of the frame F, with the manure-box, plough, &c., may be left off for certain kinds of seed, when a very light and easily-handled seed-planter will be obtained.

I claim as new, and desire to secure by Letters Patent—

1. The arrangement of the vertical arbor $e$, carrying revolving arms $j$ and $l$ respectively below and above the bottom of the seed-box, substantially as herein shown and described.

2. The frame F of a seed-planter, when hinged to a supporting frame, A, and when connected with the same by means of supports $bb$, all made and operating substantially as herein shown and described.

3. The funnel-shaped lower part I of the seed-box, when secured to the frame F, in combination with the hopper J secured to the frame A, all made and operating substantially as herein shown and described.

4. The driving-wheel C of a seed-planter, when connected by means of suitable rods or shafts with the revolving arbor $e$, having the arms $j$ and $l$, all made and operating substantially as herein shown and described.

5. The fertilizer-box, when arranged substantially as herein shown and described, in combination with the seed-box H, driving-wheel C, and frames A and F, all made and operating substantially as herein shown and described.

6. The arrangement and combination with each other of the plough N, tube $r$, shares O, flattener P, adjustable marker R, seed-dropper J, shares S, and roller D, all made and operating substantially as herein shown and described.

JOHN STARK

Witnesses:
WM. F. McNAMARA,
ALEX. F. ROBERTS.